UNITED STATES PATENT OFFICE.

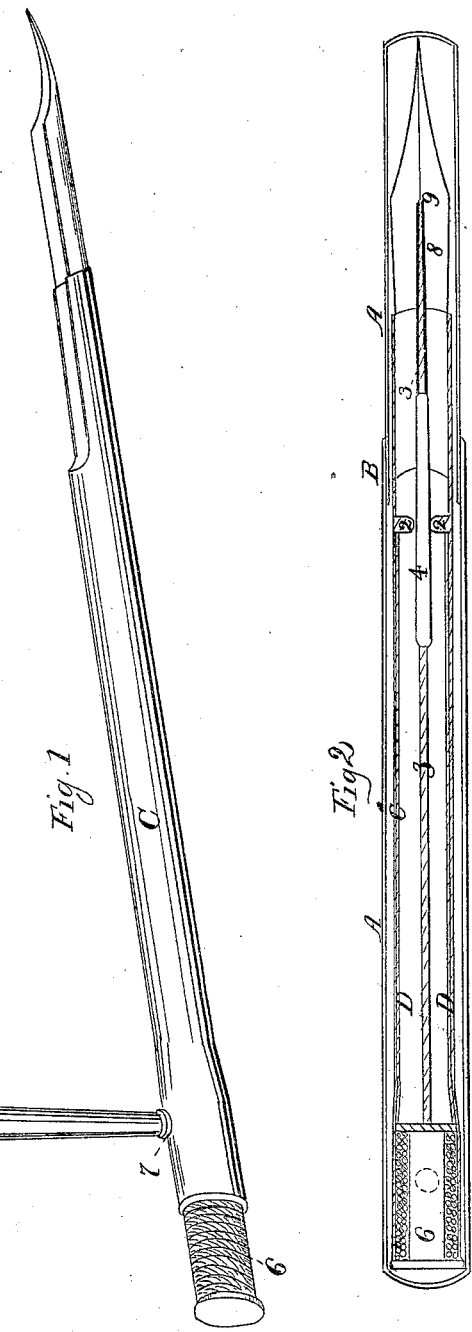

P. C. CLARK, OF READING, PENNSYLVANIA.

IMPROVEMENT IN FOUNTAIN-PENS.

Specification forming part of Letters Patent No. 31,298, dated February 5, 1861.

*To all whom it may concern:*

Be it known that I, P. C. CLARK, of the city of Reading, county of Berks, and State of Pennsylvania, have invented certain new and useful Improvements in Fountain-Pens; and I do hereby declare that the following is a full and exact description thereof, reference being had to the accompanying drawings, and to the letters and figures of reference marked thereon, in which—

Figure 1 is a perspective view, and Fig. 2 is a longitudinal section.

The nature of my invention consists in so constructing and combining the several new and useful devices together, as herein described, so as to form an economical and efficient fountain-pen, in which—

A, Fig. 2, represents the pen-case, which is constructed in two parts, and is properly fitted together, as represented at B.

C represents the pen-holder, inside of which is formed the fountain for containing the ink, which is lined with morocco, as represented at D, in order to protect the metal from the corrosive action of the ink.

2 is a valve-seat rigidly secured to the inside of the pen-holder, as represented.

3 is a conducting-rod secured into the piston-head 6, and passes through the pen-holder to the pen, and is furnished with an elongated flexible or elastic valve 4, to the lower end of which is secured a thread 8, which passes along both sides and through a small hole or eye 9 in the end of the conducting-rod 3. The valve 4 is formed of cotton flannel, and of suitable size and proportions to pass over the thread to its proper place upon the conducting-rod, and is secured by lashing it at both ends. The skeleton piston-head 6 is packed with cotton twine or other equivalent packing, by which means a proper sliding piston-head or air-valve is formed, and when drawn up so as to admit a small quantity of air through the filling-tube 7 permitting the ink to descend by its own gravity.

In order to fill the fountain, the piston-head 6 is drawn past the filling-tube 7 just far enough to form a communication, the funnel being inserted into the filling-tube 7 and the lower end of the pen slightly elevated, allowing the air to pass from the fountain while being filled.

I do not claim a pen provided with a fountain or reservoir in the pen holder or handle; neither do I claim the movable piston, as described, or the mode of admitting air into the fountain by means of the piston for regulating the flow of the ink; but What I do claim as my invention, and desire to secure by Letters Patent, is—

The conducting-rod, when said rod is provided with an elongated flexible or elastic valve and conducting-string 8, when constructed as herein described, and for the purpose set forth.

P. C. CLARK.

Witnesses:
 G. S. KINSEY,
 GEORGE PRINTZ.